United States Patent [19]

Roberts

[11] 4,103,038
[45] Jul. 25, 1978

[54] EGG REPLACER COMPOSITION AND METHOD OF PRODUCTION

[75] Inventor: W. L. Roberts, Mequon, Wis.

[73] Assignee: Beatrice Foods Co., Chicago, Ill.

[21] Appl. No.: 726,187

[22] Filed: Sep. 24, 1976

[51] Int. Cl.² ............................................. A23J 3/00
[52] U.S. Cl. ................................. 426/601; 426/602; 426/657
[58] Field of Search ............... 426/12, 250, 613, 614, 426/583, 601, 602, 657

[56] References Cited

U.S. PATENT DOCUMENTS

| | | | |
|---|---|---|---|
| 2,695,235 | 11/1954 | Goede | 426/583 |
| 3,640,732 | 2/1972 | Johnson | 426/575 |
| 3,706,575 | 12/1972 | Broadhead | 426/614 |
| 3,717,474 | 2/1973 | Fioriti et al. | 426/614 |
| 3,806,608 | 4/1974 | Perret | 426/614 |
| 3,930,039 | 12/1975 | Kuipers | 426/583 |

OTHER PUBLICATIONS

Webb, Ed, By Products from Milk, 2nd ed., Whey, Avi Pub. Co., Westport, Conn., pp. 18–20, 1970.

*Primary Examiner*—Jeanette M. Hunter
*Attorney, Agent, or Firm*—Murray & Whisenhunt

[57] ABSTRACT

An egg replacer composition containing no egg yolk or egg white is provided which is low in cholesterol, high in the ratio of polyunsaturated fats to saturated fats and is avidin free. The composition comprises from 30 to 75% by weight of whey protein derived by ultrafiltration/concentration, from 5 to 65% by weight of fats having a polyunsaturated to saturated ratio of 1:1 to 2.8:1 and from 0.2 to 17.0% by weight of a food grade emulsifier, preferably lecithin, in order to more closely approximate the nutritional characteristics of natural eggs. The composition will have a cholesterol content of less than 0.5 mg. per gram of composition and is avidin free. The absence of avidin allows the biotin to avoid complexing and the biotin is thus available for nutritional use.

22 Claims, No Drawings

EGG REPLACER COMPOSITION AND METHOD OF PRODUCTION

BRIEF SUMMARY OF THE INVENTION

The present invention relates to an egg replacer composition which is low in cholesterol, high in ratio of polyunsaturated fats to saturated fats and is avidin free. The composition can be used for both simulating cooked egg and for use in food preparation in a similar manner as a natural egg. The nutritional value of the present egg replacer material may be essentially that of natural eggs, with the exception of the low cholesterol content and a higher P:S ratio as well as the absence of avidin.

BACKGROUND OF THE INVENTION

Substantial efforts have been made in the art to produce egg replacer compositions which provide nutritional values similar to natural eggs, but which do not include certain undesired properties of natural eggs. For example, the American Heart Association recommends that the percentage of calories from saturated fat in the daily diet be from about 4 to 5%, while the percentage of calories from polyunsaturated fat be from about 10 to 11%. Additionally, it is recommended that the amount of cholesterol in the daily diet be substantially restricted. However, the yolk of natural eggs is relatively high in both saturated fats and cholesterol. Thus, while eggs are relatively low in calories and have high nutritional value, eggs are often restricted in the diet for reasons of the relatively high amount of saturated fats and cholesterol in the egg yolk. Such restrictions on the intake of eggs not only eliminates a nutritional food from the diet, but additionally often disrupts eating patterns of long standing, i.e. the intake of eggs particularly for breakfast. Such disruption of long standing eating patterns has an adverse phychological effect upon the dieter.

For the foregoing reasons, there has been a substantial effort in the art to provide egg replacers which are sufficiently palatable as to be accepted by the dieter but which is yet low in saturated fats and cholesterol. The approaches in the art, generally, have been to duplicate the natural egg wherever possible and to deviate from the natural constituents of eggs only where necessary, e.g. in the use of unsaturated fats and the elimination of cholesterol. Thus, the general approach in the art is that of using natural egg whites in egg substitute materials, since the white per se does not substantially contribute to the above discussed difficulties with natural egg. The "yolk" of the egg replacer is then compounded from combinations of unsaturated oils, minerals and vitamins so as to as closely as practical approximate the nutritional characteristics of the yolk, absent of the saturated fats and cholesterol.

These efforts in the art have met with substantial success, but on the other hand these efforts have resulted in compositions which present other problems to the consumer. These problems have so complicated the use of presently available egg substitute compositions that consumer acceptance has been substantially less than that anticipated by the art.

For example, natural egg whites used in conventional egg substitute compositions, are subject to relatively rapid bacterial action and degradation once the white is removed from the egg shell. Thus, provisions must be made in the conventional compositions to retard this bacterial action. Also, as is known in the art, the drying of egg whites, e.g. spray drying, introduces substantial unwanted off-flavors in the egg whites and, therefore, the dried form of conventional egg replacer compositions have never been accepted by the consuming public. This requires that the conventional compositions be transported and stored in a frozen form or under refrigeration, and even then the shelf life is relatively short.

Natural egg whites also contain about 0.05% of avidin, a glycoprotein that combines with biotin making the biotin biologically unavailable. A 50 gram egg contains approximately 1.76 mg. of avidin and 11.2 mcg. of biotin. Avidin, which has a molecular weight of about 64,800, contains four subunits each of which combines with one molecule of biotin (molecular weight about 244.3). Thus, each milligram of avidin will combine with about 15.1 mcg of biotin, and the approximately 1.76 mg of avidin in a 50 gm egg has, therefore, the potential for combining with about 26.6 mcgs of biotin. Since a 50 gm egg contains only about 11.2 mcg of biotin, sufficient avidin remains to combine with 15.4 mcgs of biotin from other sources. Avidin is extremely resistant to proteolytic digestion and the association of biotin with avidin makes the biotin unavailable for nutritional use. The resulting avidin/biotin complex possesses a high association constant and is very resistant to heat.

Accordingly, it will be appreciated that when a natural egg is thoroughly mixed, essentially all the biotin is made nutritionally unavailable by combining with avidin and that complexed biotin is still unavailable after cooking. Fortunately, some uses of whole eggs do not result in such total mixing of the yolk and white and formation of the avidin/biotin complex is substantially reduced. On the other hand, many conventional egg substitutes use egg white as the functional ingredient and this ingredient is intimately mixed with the substitute "yolk" which will contain biotin if an effort has been made to duplicate the materials and vitamins in natural egg. Thus, in special hospital or emergency feeding where there is limited food intake and thus limited biotin intake, biotin deficiencies may occur when conventional egg substitute materials, based on natural egg whites as protein sources, form a significant portion of the diet.

Additionally, conventionally available compositions, based on egg white as the protein source, have experienced difficulty in being adequately formulated for reproducing the physical property necessary for simulating a scrambled egg and at the same time simulating the physical properties imparted by eggs in conventional recipes, e.g. custards, puddings and the like. Thus, generally speaking, the egg replacer compositions have been essentially formulated to simulate scrambled eggs in the cooked form and the properties of these compositions have not allowed widespread use in recipes and in a manner which will essentially duplicate natural egg. On the other hand, if formulations are prepared for duplicating the physical properties of egg in a recipe, the scrambled egg form is often unacceptable to many of the consuming public.

It would, of course, be of considerable value in the art to provide egg replacer compositions which retain the advantages of the conventionally available compositions, but while on the other hand avoid the difficulties associated therewith.

OBJECTS OF THE INVENTION

It is therefore an object of the invention to provide an egg replacer composition which is not only low in cholesterol and high in the ratio of polyunsaturated fats to saturated fats, but which additionally is avidin free. It is a further object of the invention to provide such compositions in a dried form which can be stored at ambient conditions for at least one year without significant degradation of the product. It is a further object of the invention to provide such compositions in a reconstituted liquid form for either relatively short shelf life or in a frozen liquid form for extended shelf life, particularly in storage. It is yet a further object of the invention to provide such egg replacer compositions which may, if desired, essentially duplicate the nutritional value of natural eggs, with the exception of the cholesterol and polyunsaturated to saturated fat ratio. It is yet a further object of the invention to provide such egg replacer compositions which function equally well in producing scrambled eggs as in use with conventional recipes. It is yet a further object of the invention to provide the egg replacer compositions in a dried form which can be easily reconstituted by simply mixing with water or other liquid and wherein no complicated or difficult to perform reconstitution procedures are required. Lastly, it is an object of the invention to provide a process for producing such egg replacer composition.

BRIEF DESCRIPTION OF THE INVENTION

The present invention is broadly based on several important discoveries. The first discovery is that an egg replacer composition can be prepared without the necessity of using natural egg whites as the protein source. This is made possible by the simultaneous discovery that a certain protein source not only provides at least an equal Protein Efficiency Ratio to that of whole egg protein but has the additional property of functioning equally well in producing scrambled egg as in recipes. This protein source contains no avidin and therefore the egg substitute can be prepared such that it is avidin free. This protein source is referred to as ultra-filtration whey protein, obtained by the ultra-filtration of sweet or acid wheys, and it will be explained further hereinafter.

The use of the ultra-filtration whey protein also allows the use of a relatively high ratio of polyunsaturated to saturated fat in the egg replacer composition, while at the same time providing the functionality required for both the scrambled eggs and recipe use.

Further, with this particular protein source and particular fat system, an emulsion may be simply prepared with a food grade emulsifier and that emulsion may be sprayed dried to a low moisture content powder which has a stable shelf life of at least one year. That powder, with the particular protein source and fat system, can be easily reconstituted for use in preparing scrambled eggs or recipes by simply mixing the sprayed dried powder with the required amount of water or other liquid. No difficult or complicated procedures are required for reconstitution.

Thus, there is provided an egg replacer composition which contains less than 0.5 mg per gram of cholesterol, a high ratio of polyunsaturated fats to saturated fats and is avidin free. The composition comprises from 30 to 75% by weight of ultra-filtration whey protein, from 5 to 65% by weight of fats having a polyunsaturated to saturated ratio of at least 1:1 and from 0.2 to 17.0% by weight of a food grade emulsifier.

With the addition of known vitamin and mineral nutrients, the egg replacer composition can have essentially the same nutritional value as eggs. This nutritional value can be made almost identical to that of eggs when lecithin is at least a part of the food grade emulsifier.

This high nutritional value is in part due to the ultra-filtration whey protein which has a Protein Efficiency Ratio at least substantially equal to that of whole egg protein and especially about a PER of 3.0.

The composition can be formulated so that it has a low sodium content, for those who must restrict the sodium intake of their diet. This cannot be accomplished when substantial levels of egg white are used. Typically, the sodium content of the composition may be kept at about 70 mg Na/100g solids. Whereas, the sodium content of a comparable product, prepared with egg white, would contain about 490 mg. Na/100g. solids.

The composition may also be brought essentially to neutrality, and at least at a pH between 6.0 and 10.0. At these pH ranges, no instability of the emulsion for the reconstituted composition exists.

The invention also provides wide latitude in the choice of the unsaturated fats. Typically, at least 95% of the fat of the composition is derived from a vegetable or nut oil, such as peanut oil, sun flower seed oil, corn oil, cotton seed oil and soybean oil and mixtures thereof.

The composition is prepared by mixing the ultrafiltration whey protein and fat with an emulsifier until an emulsion is formed. That emulsion is sprayed dried at an inlet temperature of 250° to 350° F. and an outlet temperature of 140° to 200° F. to reach a moisture content of the composition of 4% by weight or less.

Accordingly, it can be seen that the objects of the invention have been achieved and a valuable contribution to the art has been made.

DETAILED DESCRIPTION OF THE INVENTION

As noted above, an important feature of the invention is based on the discovery that a certain protein source is free of avidin, has a Protein Efficiency Ratio (PER) of essentially that of whole egg protein, can be prepared into a stable emulsion with conventional food grade emulsifiers (particularly lecithin), can be sprayed dried in a non-degradating manner, and will allow easy reconstitution for use in both making scrambled eggs and in typical food recipes. This protein source is referred to as ultra-filtration whey protein. It is, of course, known that cheese whey contains among other things, a wide range of proteins, fat, lactose, lactic acid and ash. Whey protein fractions containing relatively low levels of protein derived by ultra-filtrations have been used as skim milk replacers, extenders for frozen desserts, bulking agents for dairy products and related applications.

The possibility of using whey protein as a substitute for egg whites has been recognized in the art in connection with whippable compositions. However, these efforts have not met with success. As pointed out in U.S. Pat. No. 3,935,323 to Feminella, dried whole whey contains relatively high lactose contents and limits its use to filler or binder applications. Whey protein concentrate (the lactose being separated therefrom by gel filtration or ultra-filtration), on the other hand, is useful as an ingredient in non-fat dry milk and as a casein substitute in food. The Feminella patent suggests heating the whey protein, in solution, to at least 90° C to produce a composition which can be whipped for up to about 8 hours after the heating. A theoretical explanation for this functionality is not given, but the patent specifically states that the protein is not suitable as a replacer for egg whites used in food systems requiring the heat-set or coagulation property of egg whites. Thus, it would not be useful for the present purposes.

Thus, the present "ultra-filtration whey protein" should be clearly distinguished from the heated protein of the Feminella patent. Generally speaking, ultra-filtration whey protein is the water soluble, undenatured protein fraction derived from cheese whey, either sweet or acid, that is retained by an ultra-filtration membrane that permits lactose, lactic acid, soluble salts and low molecular weight nitrogen compounds, such as urea and amino acids, to pass through the membrane. Membranes of this nature may be either synthetic polymers or cellulosic membranes. Ultra-filtration membranes are made by the following companies: Abcor, DDS (labeled Hyper-filtration membrane), Union Carbide, Romicon, Dorr-Oliver and Universal Oil Products (Fluidcides Division). All of these membranes are acceptable for producing the present ultra-filtration whey protein.

The present whey protein fraction is also characterized in that it is undenatured, i.e., it has not been heated to an extent where the heat-set or coagulation property has been altered or has not been precipitated by the use of acids or the like. It is also characterized in that the dried protein can be reconstituted in water to provide an opaque liquid, which is not a normal property of denatured whey protein. The protein fraction is also water soluble (or forms a stable colloidal suspension).

The protein content of the solids which passed through the ultra-filtration membrane can vary from as low as 12% to as high as 95%. However, for present purposes the protein content should be at least 50% of the solids content, e.g. at least 70%, and usually at least 80%.

Thus, for purposes of the present specification, the term "ultra-filtration whey protein" is hereby defined to mean the water soluble, undenatured protein fraction derived from cheese whey which protein fraction is retained by an ultra-filtration membrane that permits lactose, lactic acid, soluble salts and low molecular weight nitrogen compounds, such as urea and amino acids, to pass through the membrane.

While the amino acid profile will vary with the particular cheese whey, Table 1 below shows a typical profile for the present ultra-filtration whey protein fraction and compares that profile with the FAO/WHO suggested amino acid profile, as well as the amino acid profile for whole egg protein. Further, to show the difference between the present ultra-filtration whey protein fraction and the protein normally associated with milk, i.e. casein, the amino acid profile for casein is also shown in that table. Note that the present ultra-filtration whey protein amino acid profile follows very closely that of whole egg protein, while the amino acid profile of casein is substantially different from both.

Table 2 compared the present ultra-filtration whey protein with whole egg protein, casein and soy protein isolate, in terms of the grams of protein needed to meet standard requirements, and further in terms of the Protein Efficiency Ratio (PER). Note specifically that the present ultra-filtration whey protein compares very favorably with whole egg protein in each category.

TABLE 1

AMINO ACID CONTENTS OF U.F. WHEY PROTEIN, WHOLE EGG PROTEIN AND CASEIN

| AMINO ACID | FAO/WHO** SUGGESTED PATTERN g. | U.F. WHEY PROTEIN g. AMINO ACIDS g./100 PROTEIN | WHOLE EGG PROTEIN g. AMINO ACIDS g./100 PROTEIN | CASEIN g. AMINO ACIDS g./100 PROTEIN |
|---|---|---|---|---|
| Isoleucine | 1.8 | 5.9 | 7.6 | 6.3 |
| Leucine | 2.5 | 13.0 | 9.7 | 9.6 |
| Lysine | 2.2 | 10.7 | 7.3 | 8.5 |
| Methionine | | 2.5 | 3.6 | 2.9 |
| Cystine | 2.4 | 4.1 | 2.6 | 0.35 |
| Phenylalanine | | 4.3 | 6.3 | 5.2 |
| Tyrosine | 2.5 | 4.1 | 4.9 | 6.5 |
| Threonine | 1.3 | 5.9 | 5.8 | 5.2 |
| Tryptophan | 0.65 | 2.5 | 1.9 | 1.8 |
| Valine | 1.8 | 6.2 | 8.6 | 7.5 |
| Histidine | | 2.5 | 2.8 | 3.2 |
| Arginine | | 3.5 | 7.4 | 4.3 |
| Glycine | | 2.3 | 4.0 | 2.0 |
| Aspartic Acid | | 12.0 | 7.4 | 7.4 |
| Glutamic Acid | | 18.4 | 13.6 | 23.3 |
| Proline | | 6.3 | 4.8 | 11.1 |
| Serine | | 5.2 | 9.3 | 6.6 |
| Alanine | | 5.6 | 7.4 | 3.3 |
| | | 115.0* | 115.0 | 115.05 |
| PER | | 3.3 | 3.2 | 2.5 |

*The potential yield of amino acids from 100g. of each of the proteins is approximately 115g.
**World Health Organization Technical Report Series No. 522. Energy and Protein Requirements. Report of a Joint FAO/WHO Ad Hoc Expert Committee. - Table 17. Estimated Amino Acid Requirements of Adults. Page 55.

TABLE 2

U.F. Whey Protein, Whole Egg Protein, Casein, And Soy Protein Isolate Ratings

| PROTEIN | Grams Protein To Meet Requirements | | ESSENTIAL AMINO ACIDS Per 100g. PROTEIN g. | PER |
|---|---|---|---|---|
| | Rose's MDR[1] | FAO/WHO[2] | | |
| U.F. Whey Protein | 16.7 | 36.4 | 59.2 | 3.3 |
| Whole Egg Protein | 17.7 | 38.7 | 58.3 | 3.2 |
| Casein | 34.0 | 73.8 | 53.85 | 2.5 |

TABLE 2-continued

| U.F. Whey Protein, Whole Egg Protein, Casein, And Soy Protein Isolate Ratings | | | | |
|---|---|---|---|---|
| PROTEIN | Grams Protein To Meet Requirements Rose's MDR[1] | FAO/WHO[2] | ESSENTIAL AMINO ACIDS Per 100g. PROTEIN g. | PER |
| Soy Protein Isolate | 39.5 | — | 46.7 | 1.8 |

[1] Protein required to meet Rose's Minimum Daily Requirements
[2] Protein to match 100 g Protein with FAO/WHO Suggested Amino Acid Pattern For a typical embodiment of the present invention, the protein, carbohydrate, fat and calories of the present composition are compared with the same for two 50 gram Eggs in Table 3. It will be seen that the comparison is quite close and the overall nutritional value of the present composition is at least equal to that of eggs.

Table 4 compares other nutritional considerations of the present composition with two whole eggs. Note particularly that the present composition has decreased the cholesterol level by a factor of 50 and has increased the polyunsaturated level by a factor of almost 3. The saturated fat level has been decreased by almost a factor of 2 and the polyunsaturated to saturated ratio is most substantially increased. Also note the low level of sodium which may be a feature of the invention and the absence of avidin. For typical embodiments, the RDA vitamins and minerals are quite in keeping with good nutritional value. In these regards, therefore, the present composition is better than whole eggs and avoids the problems noted above in connection with BACKGROUND OF THE INVENTION.

TABLE 3

| Composition And Egg Comparisons/Serving | | |
|---|---|---|
| | Composition | 2-50 g Eggs |
| Protein | 13.0 | 12.8 |
| Carbohydrate | 1.0 | 1.0 |
| Fat | 11.4 | 11.5 |
| Calories | 160 | 160 |

TABLE 4

| | One Serving Composition | | One Serving 2-50 g Eggs | |
|---|---|---|---|---|
| LOW Cholesterol | 10 | mg | 550 | mg |
| HIGH Polyunsaturated | 4.1 | g | 1.5 | g |
| LOW Saturated | 2.4 | g | 4.5 | g |
| Polyunsaturated: Saturated Ratio | 1.7:1 | | 0.33:1 | |
| LOW Sodium | 34 | mg | 111 | mg |
| NO Avidin* | None | | 3.5 | mg |
| RDA Vitamins and Minerals | 6% RDA | | Varied RDA | |
| Calcium: Phosphorous Ratio | 1.2:1 | | 0.26:1 | |

TABLE 5

| Analysis Of Whey Protein Solids | |
|---|---|
| Protein | 80.0% |
| Fat | 4.6 |
| Lactose | 5.8 |
| Lactic Acid | 4.6 |
| Ash | 4.4 |
| Undetermined | 0.6 |
| | 100.0% |

It should be appreciated that the ultra-filtration whey protein, derived from cheese whey, may contain small amounts of cholesterol and fat. An analysis of a typical ultra-filtration whey protein concentrate is shown in Table 5. Relatively inexpensive polyunsaturated fats and oils may be added to the composition to obtain the desired polyunsaturated to saturated ratio. Typical satisfactory oils are corn oil, peanut oil, soybean oil, cottonseed oil, sunflower seed oil, safflower seed oil and blends of these oils. Peanut oil is an excellent source of polyunsaturates and at the same time supplies flavor to the composition which more nearly approaches the flavor of whole eggs and avoids some of the "oily" flavor, often associated with conventional egg substitute material. The discovery of this factor for peanut oil constitutes an advantage of the invention and is a preferred embodiment of the invention. However, in the broader sense, any vegetable or nut oil may be used that makes it possible to obtain polyunsaturated to saturated ratios in the range of 1:1 to 2.8:1. For most applications the target value is 1.7:1.

Any food grade emulsifier may be used for present emulsification purposes and, indeed, combinations of emulsifiers may be used if desired. For example, any of the long chain fatty acid glycerol emulsifiers may be used, which normally have a C-12 to C-20 esterified chain. Typically among these are glycerol-lactopalmitate or the stearate, etc. Alternatively, propylene derived emulsifiers may be used, such as propylene glycol monostearate, or the oleate, palmitate, myristate, etc. Likewise, the "Span" series of emulsifiers may be used. These are well-known emulsifiers and are fatty acid partial esters of sorbitol anhydrides (or sorbitan). A preferred emulsifier is the "Tween" series, which is well known to the art. Tweens are polyoxyethylene derivatives of fatty acid partial esters of sorbitol anhydride. Typically, Tween 80 is used, for its overall combination of properties, and this is a preferred embodiment.

Natural egg contains lecithin and to duplicate the nutritional value of the egg, it is preferred to incorporate some lecithin in the present composition. The use of lecithin not only provides some of the essential nutrients but further improves emulsion stability. The combination of, for example, lecithin and Tween 80 provides such as stable emulsion that the emulsion can be easily and conveniently spray dried, and the spray dried powder which results therefrom can be easily and conveniently reconstituted for use in the dried composition.

Of the three required ingredients, the ultra-filtration whey protein should be contained in the composition in amounts of from about 30 to 75% by weight of the composition, although the amounts between about 35 and 70% are preferred. Generally, however, about 45% is the target value. The total fat content, including the fat associated with the whey protein, the unsaturated fat added to the composition and any other fats by virtue of other ingredients should range between about 5 and 65%, although that range will normally be between 15 and 50%. A target value is about 45%. In the preferred embodiment, the amount of protein and fat are adjusted so that the protein/fat ratio is about 1:1, which is substantially the same ratio as in natural egg.

The amount of the emulsifier can vary widely, but too little emulsifier will not provide the stable emulsion required, nor will it allow easy reconstitution of the ingredients of the composition. On the other hand, too high amounts of emulsifier will interfere with the physical properties of the reconstituted material. For these reasons, it is preferred that the emulsifier be from about 0.2 to about 17%, although that range will be more normally about 0.5 to 7%. A good value is about 4.0%.

The particular vitamins and minerals can be, essentially, chosen at will and, indeed, they may be omitted altogether. It is possible to include in the composition all the recognized required vitamins and minerals and at the daily level required. However, this is most probably neither necessary nor desired. More typically, vitamins and minerals included in the composition will equal from about 6% RDA to about 25% RDA. It is believed that a good target value in this regard is about 6% RDA. This will provide the vitamins and minerals closely approximating but superior to those of natural egg.

The composition is advantageously provided in a powder form of relatively low moisture content, e.g., at least below 4% by weight and more preferably below 3% by weight. This will provide an exceptionally long shelf-stable product. For ease of flowing of the powdered composition, an inert, edible flow control agent may be included in the composition. Any of the well-known flow control agents are acceptable, for this purpose, but fumed silica is quite useful, although others of the silicas may be used, as well as flow control agents derived from foods, such as dextrins, cornstarch, whey solids and the like.

Conveniental coloring agents, such as the USDA colors, carotene, etc. may be used, as well as conventional preservatives, such as BHT, BHA, TBHQ, citric acid, etc.

In addition to a powdered form, the composition may be supplied to the consumer in liquid form. The powdered form, however, is adaptable to broader useage. The liquid form, reconstituted with water, is normally used for the preparation of scrambled eggs, omelets, French toast, egg salad, etc. The liquid form may be prepared from emulsions or it may be prepared by drying the emulsion and reconstituting the dried powder. This latter method is most convenient for bulk handling, since production of the composition can commence and end completely through the storage stable dry powder stage and if reconstitution to the liquid form is desired, such reconstitution can be prepared as required for immediate market needs. Once the composition has been reconstituted in liquid form, however, it must be stored under refrigerated conditions, preferably frozen. The dried powder may be reconstituted with any desired edible liquid which will, essentially, solvate the powder, or be incorporated with dry mixes, in which cases, reconstitution occurs when liquid is added. Thus, while it is possible to reconstitute the composition with liquids such as alcohol, absent some unusual circumstances, the reconstituting liquid will be principally water or milk. The water may contain additional ingredients, for example, alcohol, glycerol, propylene glycol, sugars, flavors and the like for the functionality imparted by those additional compositions and compounds.

The composition may also include edible acids and bases, such as acetic acid, citric acid, lactic acid, potassium hydroxide, sodium hydroxide, calcium hydroxide, magnesium hydroxide, ammonium hydroxide, and the like, in order to adjust the pH within the desired range of 6.0 to 10.0. Conventional buffers may also be used if desired, although the same is not necessary.

As noted above, the dried form of the invention is the most shelf stable, and no significant deterioration will take place in hermetically sealed containers, within about one year at ambient conditions. However, once the dried powder has been reconstituted, it must be stored under refrigeration or frozen, and in the former regard, the composition should be used within about 24 hours and in the latter regard the composition should be used within about six months. By careful selection and processing, however, the dried composition will remain storage stable without significant degradation for one year or more when stored in hermetically sealed containers. As can be appreciated, this is a very convenient form of the invention and allows the ultimate consumer to conveniently store the composition and reconstitute the same as needed for preparing eggs and recipes.

The powdered form makes broad usage of the composition possible. The powdered form permits incorporation of the desired quantities of the composition with the dry ingredients used for the preparation of cakes, cookies, muffins, breads, dessert powder mixes, etc. Reconstitution of the composition takes place "in situ" when the liquids are added. For other uses, such as for scrambled eggs, omelets, salad dressings, etc., the powder is mixed with the liquid. The ratio of liquid to composition will, of course, vary with proportions of the ingredients of the composition, as discussed above, and with the desired consistency required. Generally speaking, however, on a weight/weight basis of composition to water, the reconstitution will vary from 1:1 to 1:5, with 1:2 to 1:4 being the preferred range. A reconstitution ratio of about 1:3 will give essentially the same characteristics of a natural egg. This is the type of mix normally used for scrambled eggs, omelets, etc. For home-use purposes, reconstitution for preparation of scrambled eggs, omelets, etc. can be done on a fluid ounce basis as follows: Into a measuring cup containing 3 fluid ounces of water, pour an amount of the composition until a total of 4 fluid ounces is obtained in the cup. After stirring, this will give a reconstituted composition essentially equal to two 50 g natural eggs. Reconstitution can be achieved simply by stirring the mixture of water and composition with a household fork or whisk. Thus, it can be seen that an extremely convenient package and reconstitution thereof is provided by the present invention.

The composition may be made by sufficiently mixing the ingredients in water to form an emulsion thereof. The weight ratio of ingredients to water can vary widely, depending upon the drying method employed, but generally from 20 to 75% by weight of the solid ingredients will be satisfactory. For oven drying, roller drying, pan drying and the like, however, the solids content should be as high as practical for use in the particular equipment intended. On the other hand, for spray drying purposes, the solids content is more usually between 20 and 50%, and particularly about 35%. The ingredients are then simply dried at temperatures up to about 140° F, when the drying is by other than spray drying, or a similar very quick drying procedure. Where spray drying is employed, much higher temperatures can be utilized and the inlet air temperature of a conventional box or tower spray dryer can be from 275° F–350° F and the outlet air temperature can be from 150° F to 190° F. The emulsion should not be heated substantially prior to entering the spray dryer, but for convenience and efficiency of operation, the emulsion can be heated just prior to entry of the nozzle of the spray dryer to temperatures of up to 140° F. The drying method should reduce the moisture content to at least 4% by weight or less. The dried powder is then simply packaged in any convenient hermetically sealed container for marketing purposes.

The invention will be illustrated by the following examples, but it is to be understood that the examples illustrate only the preferred embodiments of the invention and that the invention is not restricted to those preferred embodiments but extends to the scope of the foregoing disclosure. One preferred embodiment is in connection with proportions and ingredients which closely approximate the nutritional value of natural egg. As noted above, however, it is not necessary that the composition be so formulated. In the examples, all proportions are by weight, unless otherwise specifically noted.

EXAMPLE 1

Preparation Low Cholesterol-Low Sodium 6% RDA/2800 cal. P:S Ratio 1.7:1 Egg Replacer 3870 lbs. of ultra-filtration whey protein concentrate, prepared from acid whey containing 449 lbs. protein (561 lbs. solids) is batch pasteurized 30 minutes at 150° F. or is HT-ST pasteurized 16 seconds at 165° F. and promptly cooled to about 80° F. The pasteurized solution is placed in a 600 gallon processing tank and 1.21 lbs. of 99.5% magnesium oxide, MgO, and 2.93 lbs. of 95% calcium hydroxide, $Ca(OH)_2$ (water slurry) is added and the solution is mixed for one hour to permit the MgO and $Ca(OH)_2$ to react. Next 0.61 lbs. of 98.5% sodium hydroxide, NaOH, (water solution) is added. After further mixing the pH is adjusted to 9.0 with 21.5% potassium hydroxide, KOH, solution. To this mixture is added 70 g of trace mineral compounds (iron, zinc, copper, manganese, and iodine) (water solution). Dried beta corotene, in water suspension, may be added at this point for the desired color. Dried beta carotene in a water suspension may be added to the water solution or oil soluble beta carotene may be added to the oil mixture, or a combination of these modes of addition may be used.

An oil mixture of the following ingredients is prepared:
Peanut oil: 332.0 lbs.
Soy lecithin (Centrol 3F DB): 44.4 lbs.
Tween 80: 1.9 lbs.
Tenox 20: 0.5 lbs.
Beta carotene (oil soluble) may be added for desired color.

The oil mixture is placed in the solution that has been adjusted to pH 9.0, and mixed thoroughly. The mixture is then homogenized at about 1500 psi and spray dried through a 72-16 spray nozzle into a conventional box spray drier. The temperature at any point ahead of the spray nozzle should not exceed about 100° F. The spray drier inlet air temperature is 300° F. The spray drier outlet temperature is 170° F. The moisture content of the spray dried powder is approximately 3% by weight. 0.5% of fumed silica (Cab-O-Sil) and 0.007% of encapsulated vitamins are added to the spray dried powder and the resulting powder is thoroughly blended. The amounts of vitamins and minerals incorporated in the product are sufficient to supply 6% RDA levels based on 2800 calories.

Table 6 provides the nutritional information and the percentages of RDA per serving of the resulting mixture. Table 7 gives nutritive comparisons of the spray dried powder with natural eggs on the basis of one ounce of the powder, which is equivalent to two 5 oz. eggs. Note how favorably the present composition compares to natural eggs. Thus, the objects of the invention have been obtained.

TABLE 6

Composition Example 1

| NUTRITIONAL INFORMATION | | | Nutrients | PERCENTAGES OF U.S. RECOMMENDED DAILY ALLOWANCES (U.S. RDA PER SERVING) | | |
|---|---|---|---|---|---|---|
| | | | | | 1 oz. Composition | |
| | | | | Units | | % RDA |
| Serving Size | 1 oz. | (28.4 g) | Protein | g | 13 | 25 |
| Calories Per Serving | 160 | | Vitamin A | IU | 315 | 6 |
| Protein Per Serving | 13 | g | Vitamin C | mg | 3.8 | 6 |
| Carbohydrate Per Serving | 1 | g | Thiamin | mg | 0.10 | 6 |
| Fat Per Serving | 12 | g | Riboflavin | mg | 0.11 | 6 |
| Percent Calories From Fat | 64 | | Niacin | mg | 1.3 | 6 |
| Polyunsaturated Per Serving | 4 | g | Calcium | g | 0.072 | 6 |
| Saturated Per Serving | 2 | g | Iron | mg | 1.2 | 6 |
| Cholesterol Per Serving | 10 | mg | Vitamin D | IU | 25 | 6 |
| Cholesterol Per 100 g Food | 30 | mg | Vitamin E | IU | 1.9 | 6 |
| Sodium Per Serving | 35 | mg | Vitamin $B_6$ | mg | 0.13 | 6 |
| Sodium Per 100 g Food | 130 | mg | Folic Acid | mg | 0.025 | 6 |
| | | | Vitamin $B_{12}$ | mcg | 0.38 | 6 |
| Information on fat and cholesterol contents is provided for individuals who, on the advice of a physician, are modifying their total dietary intake of fat and cholesterol. | | | Phosphorous | g | 0.060 | 6 |
| | | | Iodine | mcg | 9.5 | 6 |
| | | | Magnesium | mg | 25 | 6 |
| | | | Zinc | mg | 0.95 | 6 |
| | | | Copper | mg | 0.13 | 6 |
| | | | Biotin | mg | 0.019 | 6 |
| | | | Pantothenic Acid | mg | 0.63 | 6 |

TABLE 7

Nutritive Comparisons of Composition And Hen's Eggs

| Nutrients | 1 oz. Composition | | | 2-50 g Eggs | |
|---|---|---|---|---|---|
| Protein | | 13.0 | g  25 | 12.8 | 25 |
| Carbohydrate | | 1.0 | g  * | 1.0 | * |
| Fat | | 11.4 | g  * | 11.5 | * |
| Calories | | 160 | 4 | 160 | 4 |
| Vitamin A | IU | 315 | 6 | 1140 | 20 |
| Vitamin C | mg | 3.8 | 6 | 0 | 0 |
| Thiamin | mg | 0.10 | 6 | 0.10 | 6 |
| Riboflavin | mg | 0.11 | 6 | 0.29 | 15 |
| Niacin | mg | 1.3 | 6 | 0.10 | 0 |
| Calcium | g | 0.072 | 6 | 0.054 | 4 |
| Iron | mg | 1.2 | 6 | 2.1 | 10 |
| Vitamin D | IU | 25 | 6 | 50 | 10 |
| Vitamin E | IU | 1.9 | 6 | 2.0 | 6 |
| Vitamin $B_6$ | mg | 0.13 | 6 | 0.26 | 10 |
| Folic Acid | mg | 0.025 | 6 | 0.009 | 2 |
| Vitamin $B_{12}$ | mcg | 0.38 | 6 | 0.28 | 4 |
| Phosphorous | g | 0.060 | 6 | 0.21 | 20 |
| Iodine | mcg | 9.5 | 6 | 12 | 8 |
| Magnesium | mg | 25 | 6 | 9.0 | 2 |

TABLE 7-continued

Nutritive Comparisons of Composition And Hen's Eggs

| Nutrients | | 1 oz. Composition | | 2–50 g Eggs | |
|---|---|---|---|---|---|
| Zinc | mg | 0.95 | 6 | 1.3 | 8 |
| Copper | mg | 0.13 | 6 | 0.17 | 8 |
| Biotin | mg | 0.019 | 6 | 0.023 | 6 |
| Pantothenate | mg | 0.63 | 6 | 2.7 | 25 |
| Sodium | mg | 34 | * | 111 | * |
| Potassium | mg | 350 | * | 149 | * |
| Manganese | mg | 0.13 | * | 0.040 | * |
| Choline | mg | 44 | * | 532 | * |
| Inositol | mg | 43 | * | 33 | * |

*No RDA Established

The invention is also illustrated by the following example:

EXAMPLE 2

Preparation Low Cholesterol-Low Sodium P:S Ratio 1.5:1 Egg Yolk Replacer (Vitamins and Minerals same as for Egg Yolk. Except Ca. 1g and P-1g/2800 cal.)

87.7 lbs. of ultra-filtration whey protein concentrate prepared from acid whey, containing 9.6 lbs. protein (12.0 lbs. solids) is pasteurized as described for Example 1. The pasteurized solution is placed in a 30 gal. processing tank and 40.5g of 95% calcium hydroxide, $Ca(OH)_2$ and 0.74g 95% magnesium hydroxide $Mg(OH)_2$ (water slurry) is added and the solution is mixed for one hour to permit the $Ca(OH)_2$ and $Mg(OH)_2$ to react. Next the pH is adjusted to 6.7 with 21.5% potassium hydroxide, KOH, solution. To the mixture is added 3.5g of trace mineral compounds (iron, zinc, copper, manganese, and iodine) and 10 g. vitamins.

An oil mixture of the following ingredients is prepared:
  Corn Oil: 3.99 lbs.
  Cotton Seed Oil: 4.44 lbs.
  Peanut Oil: 4.17 lbs.
  Coconut Fat #76: 2.48 lbs.
  Soy Lecithin (Centrol 3F-DB): 2.47 lbs.
  Beta Carotene HS: 2.5 g
  Tenox 20: 10 g The oil solution is placed in the solution that has been adjusted to pH 6.7 and mixed thoroughly. The mixture is then homogenized and spray dried as described for Example 1. Fumed silica (Cab-O-Sil) can be added to facilitate flow.

The following are examples of the usages of compositions Example 1 and Example 2.

EXAMPLE 3

SCRAMBLED EGGS 3 oz. water
1 oz. dry powder composition Example 1
1 teaspoon cooking oil.

Put water and composition Example 1 powder in bowl. Beat with rotary beater or wire whisk until well blended. Heat oil in skillet, pour in mixture. Do not add salt prior or during cooking. Cook slowly, stirring occasionally, just enough to let uncooked portion flow to bottom. Turn, place on warm plate. If desired season to taste.

EXAMPLE 4

BAKED CUSTARD 2 oz. dry powder composition of Example 1
⅓ cup sugar
¼ teaspoon salt
2⅓ cups milk, scalded, cooled
1½ teaspoons vanilla
Nutmeg Combine composition Example 1 powder, sugar and salt. Gradually add small amount milk, beating with a wire whisk to make a smooth paste. Beat in remaining milk, and vanilla and strain. Fill five 5-ounce or four 6-ounce custard cups. Sprinkle with nutmeg. Place in shallow pan. Pour hot water around custard cups, 1-inch deep. Bake at 325° for 45 to 50 minutes, or until knife inserted between middle and edge comes out clean. Serve chilled.

EXAMPLE 5

DEVILS FOOD CAKE

⅔ cup margarine
1½ cups sugar
3 squares (1 ounce each) unsweetened chocolate melted, cooled
2¼ cups sifted cake flour
2 oz. dry powder composition of Example 1
1 teaspoon salt
1 teaspoon soda
1¼ cups skim milk
6 tablespoons (3 oz.) water Beat margarine and sugar until creamy and fluffy. Blend in chocolate. Add sifted dry imgredients alternately with skim milk and water, beginning and ending with dry ingredients. Turn batter into two greased 9-inch round cake pans. Bake at 350° F. for 30 to 35 minutes. Cool in pans on wire rack 10 minutes. Turn onto racks and cool completely.

EXAMPLE 6

SPECIAL MAYONNAISE 2 tablespoons cider vinegar
½ teaspoon salt
Dash white pepper
½ teaspoon sugar
¼ teaspoon dry mustard
3 oz. water
1 oz. dry powder composition of Example 1
1½ cups salad oil
1 tablespoon lemon juice Place vinegar, salt, pepper, sugar, dry mustard, water and composition 1 powder in container of electric blender or bowl of electric mixer; mix well. Add oil, one teaspoon at a time, until ¼ cup has been added. At high speed add remaining oil in a thin steady stream, alternating last ½ cup with lemon juice. Store in closed container in refrigerator.

EXAMPLE 7

BUTTER CRISPIES

½ cup (1 stick) margarine
½ cup sugar
1½ oz. dry powder of Example 2
1 teaspoon vanilla
1½ cups sifted all-purpose flour
2 teaspoons baking powder
½ teaspoon salt
Candied cherries, cut in halves Add composition Example 2 to dry ingredients other than sugar. Beat butter and sugar until creamy and fluffy. Add vanilla and beat until well mixed. Stir in sifted dry ingredients. Chill. Form dough into 1-inch balls. Place balls 1 inch apart on greased cookie sheet. Press half of cherry into center of each. Bake at 350° F. for 10 to 12 minutes.

EXAMPLE 8

BOILED DRESSING 2 tablespoons flour
1 teaspoon dry mustard
½ teaspoon salt
2 tablespoons sugar
¾ cup milk
¾ oz. dry powder Example 2
1/4 cup cider vinegar
1 tablespoon butter Combine flour, mustard, salt, sugar and dry powder composition No. 2 in small sauce pan. Stir in milk and vinegar. Cook over low heat, stirring constantly, until smooth and thick enough to mound slightly. Stir in butter; chill.

Thus, the objects of the invention have been obtained. The preferred composition consists essentially of the abovedefined ultra-filtration whey protein, fats and emulsifier. However, the composition may consist essentially of those same defined ingredients plus the defined vitamin and/or minerals. These compositions are heat settable or coagulable in addition to being low in chloestorol and high in unsaturated fats, as defined. The invention is, however, not limited to the preferred embodiments but extends to the scope of the following claims.

What is claimed is:

1. An egg replacer composition which is low in cholesterol, high in the ratio of polyunsaturated fats to saturated fats, avidin free and which is heat settable or coagulable, comprising:
   (a) from 30 to 75% by weight of ultrafiltered whey protein;
   (b) from 5 to 65% by weight of fats having a polyunsaturated to saturated ratio of 1:1 to 2.8:1, and
   (c) from 0.2 to 17.0% by weight of a food grade emulsifier;
and wherein the cholesterol content is less than 0.5 mg. per gram of composition.

2. The composition of claim 1 wherein the composition also contains nutritional amounts of vitamins and minerals.

3. The composition of claim 1 wherein the composition contains soy lecithin.

4. The composition of claim 1 wherein the Protein Efficiency Ratio of the ultra-filtered whey protein is at least substantially equal to that of whole egg protein.

5. The composition of claim 4 wherein the Protein Efficiency Ratio is at least 3.0.

6. The composition of claim 1 wherein the weight protein/fat ratio is about 1:1.

7. The composition of claim 1 in a liquid or dry powder form.

8. The dry composition of claim 7 wherein an inert, edible silica flow control agent is included in the composition.

9. The composition of claim 7 in a spray dried form.

10. The composition of claim 7 wherein the liquid is water.

11. The composition of claim 1 wherein the sodium content of the composition is less than 1.3 mg. per gram of composition.

12. The composition of claim 1 wherein the cholesterol content of the composition is less than 0.5 mg. per gram of composition.

13. The composition of claim 1 wherein the pH of the composition is between 6.0 and 10.0.

14. The composition of claim 1 where at least 95% of the fat is derived from vegetable or nut oil.

15. The composition of claim 14 wherein the oils are selected from the group consisting of peanut oil, sun flower seed oil, corn oil, cotton seed oil, soy bean oil and safflower oil and mixtures thereof.

16. The composition of claim 15 wherein the oil consists essentially of peanut oil.

17. The composition of claim 1 in a cooked form which resembles scrambled eggs.

18. The composition of claim 1 in admixture with a food.

19. The composition of claim 18 in a cooked form.

20. The composition of claim 1 in a dried form and having a shelf life of at least one year.

21. The product of claim 1 in a frozen liquid form.

22. A method for producing the composition of claim 1 comprising:
   (a) mixing the ultra-filtration whey protein with the fat and emulsifier until an emulsion is formed; and
   (b) spray drying the emulsion with an inlet temperature of 275°–350° F and an outlet temperature of 150° to 200° F to reach a moisture content of the composition of 4% by weight or less.

* * * * *